US012810623B2

(12) United States Patent
Ahn et al.

(10) Patent No.: US 12,810,623 B2
(45) Date of Patent: Nov. 24, 2026

(54) UNMANNED VEHICLE AND DYNAMIC OBSTACLE TRACKING METHOD

(71) Applicant: HANWHA AEROSPACE CO., LTD., Changwon-si (KR)

(72) Inventors: Seung Uk Ahn, Changwon-si (KR); Youngwoo Seo, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 411 days.

(21) Appl. No.: 18/241,515

(22) Filed: Sep. 1, 2023

(65) Prior Publication Data

US 2024/0273914 A1 Aug. 15, 2024

(30) Foreign Application Priority Data

Feb. 10, 2023 (KR) ........................ 10-2023-0018215

(51) Int. Cl.
*G06V 20/58* (2022.01)
*G06T 7/11* (2017.01)
(Continued)

(52) U.S. Cl.
CPC ................ *G06V 20/58* (2022.01); *G06T 7/11* (2017.01); *G06T 7/136* (2017.01); *G06T 7/73* (2017.01); *G06T 11/00* (2013.01); *G06V 10/764* (2022.01); *G06V 20/70* (2022.01); *B60W 40/02* (2013.01); *B60W 60/001* (2020.02); *B60W 2420/40* (2013.01); *B60W 2420/403* (2013.01);
(Continued)

(58) Field of Classification Search
CPC ............... B60W 40/02; B60W 60/001; B60W 2420/40; B60W 2420/403; B60W 2420/408; B60W 2554/20; B60W 2554/40; G06T 7/11; G06T 7/136; G06T 7/70; G06T 7/73; G06T 11/00; G06T 2207/30261; G06V 10/764; G06V 20/58; G06V 20/70
See application file for complete search history.

(56) References Cited

U.S. PATENT DOCUMENTS

2011/0282581 A1* 11/2011 Zeng ....................... G01S 17/89
701/301
2020/0409387 A1* 12/2020 Tsurumi ............... G05D 1/0238
(Continued)

FOREIGN PATENT DOCUMENTS

CN 114812435 A * 7/2022 ............. G06F 18/23
CN 115410176 A * 11/2022 ............. G06V 20/58
(Continued)

*Primary Examiner* — Aaron W Carter
*Assistant Examiner* — Joshua B. Crockett
(74) *Attorney, Agent, or Firm* — Sughrue Mion, PLLC

(57) ABSTRACT

A dynamic obstacle tracking method includes: acquiring, from an environment recognition sensor, environmental data regarding surroundings of an unmanned vehicle; generating an occupancy map, that is grid-based, by processing the environmental data; obtaining objects by performing an object segmentation process on the occupancy map; filtering out areas from the occupancy map that are occupied by objects that have a size greater than a first threshold value, among all of the objects obtained based on the object segmentation process; and finding dynamic obstacles by searching for the dynamic obstacles in an entirety of the occupancy map except for the areas that are filtered out.

14 Claims, 12 Drawing Sheets

(51) Int. Cl.

| | |
|---|---|
| ***G06T 7/136*** | (2017.01) |
| ***G06T 7/73*** | (2017.01) |
| ***G06T 11/00*** | (2026.01) |
| ***G06V 10/764*** | (2022.01) |
| ***G06V 20/70*** | (2022.01) |
| *B60W 40/02* | (2006.01) |
| *B60W 60/00* | (2020.01) |

(52) U.S. Cl.
CPC ... *B60W 2420/408* (2024.01); *B60W 2554/20* (2020.02); *B60W 2554/40* (2020.02); *G06T 2207/30261* (2013.01)

(56) References Cited

U.S. PATENT DOCUMENTS

| | | | | |
|---|---|---|---|---|
| 2022/0055660 | A1* | 2/2022 | Bälter | B60W 30/09 |
| 2022/0164609 | A1 | 5/2022 | Lee et al. | |
| 2022/0383749 | A1* | 12/2022 | Ishikawa | G06V 20/70 |
| 2024/0077874 | A1* | 3/2024 | Aizawa | B60W 30/09 |

FOREIGN PATENT DOCUMENTS

| | | | | |
|---|---|---|---|---|
| DE | 102013223803 | A1 * | 5/2015 | G06F 30/20 |
| KR | 10-1864127 | B1 | 6/2018 | |
| KR | 10-2338665 | B1 | 12/2021 | |

* cited by examiner

UNMANNED VEHICLE AND DYNAMIC OBSTACLE TRACKING METHOD

CROSS-REFERENCE TO THE RELATED APPLICATION

This application claims priority from Korean Patent Application No. 10-2023-0018215, filed on Feb. 10, 2023, in the Korean Intellectual Property Office, and all the benefits accruing therefrom under 35 U.S.C. 119, the contents of which in its entirety are herein incorporated by reference.

BACKGROUND

1. Field

Embodiments of the present disclosure relate to an unmanned vehicle capable of autonomously driving and technology for facilitating the driving of the unmanned vehicle using detection and movement information of a dynamic obstacle.

2. Description of the Related Art

With recent developments in vehicle-related technology, autonomous driving technology including an unmanned vehicle that can autonomously drive without human manipulation has attracted attention. When the unmanned vehicle is driving, no particular human manipulation is input to the unmanned vehicle, so the unmanned vehicle needs to identify drivable areas on its own.

In the past, the driving of the unmanned vehicle in urban areas was mainly considered, and research has been conducted on ways to identify roads that can actually be driven, other than woods or sidewalks that can hardly be driven, and thus to identify a drivable area in an urban area.

Methods using neural networks, such as image segmentation and light detection and ranging (lidar) segmentation, can be used to identify a drivable area in an urban area. However, in the case of image segmentation, performance degradation may occur due to changes in illuminance and the color of the ground, depending on the weather, and even in the case of lidar division, performance degradation due to changes in reflectance may occur depending on the state of the surface of the ground.

In the related art, a grid-based mapping method for the surroundings of an unmanned vehicle, using a camera and a three-dimensional (3D) scanner (or lidar), may be provided. Specifically, super pixels are extracted using a camera image, cells of a grid are clustered using depth data and 3D point data from the 3D scanner, the dynamic state of the clustered grid cells is predicted in accordance with changes in the posture of the unmanned vehicle, and obstacles are tracked and predicted based on movement information of particles. This method focuses on effectively creating information regarding dynamic obstacles using multi-sensors.

However, such related art requires the use of multi-sensors, and there is difficulty in creating obstacle information simply by using a single sensor. Also, when creating dynamic obstacle information based on particles, false positives such as misidentified dynamic obstacles that actually are static obstacles are frequent. This problem is apparent especially in areas with obstacles widely distributed, such as guardrails around roads in urban environments or thick forests around driving paths in wild environments, and such false positives are a representative cause of the deterioration of the performance of autonomous driving.

SUMMARY

Embodiments of the present disclosure provide an improvement in the performance of the autonomous driving of an unmanned vehicle by effectively reducing false positives such as misidentified dynamic obstacles that actually are static obstacles.

According to embodiments of the present disclosure, a dynamic obstacle tracking method performed by at least one processor is provided. The dynamic obstacle tracking method includes: acquiring, from an environment recognition sensor, environmental data regarding surroundings of an unmanned vehicle; generating an occupancy map, that is grid-based, by processing the environmental data; obtaining objects by performing an object segmentation process on the occupancy map; filtering out areas from the occupancy map that are occupied by objects that have a size greater than a first threshold value, among all of the objects obtained based on the object segmentation process; and finding dynamic obstacles by searching for the dynamic obstacles in an entirety of the occupancy map except for the areas that are filtered out.

According to one or more embodiments of the present disclosure, the performing the object segmentation process includes performing the object segmentation process only on areas of the occupancy map that have an occupancy rate greater than a second threshold value.

According to one or more embodiments of the present disclosure, the finding the dynamic obstacles includes repeatedly performing particle generation, prediction, and update processes on the entirety of the occupancy map except for the areas that are filtered out.

According to one or more embodiments of the present disclosure, the dynamic obstacle tracking method further includes displaying marks that indicate the dynamic obstacles that are found on the occupancy map.

According to one or more embodiments of the present disclosure, the dynamic obstacle tracking method further includes displaying movement information corresponding to the marks, the movement information including at least one from among a position, a moving direction, and a moving speed of each of the dynamic obstacles that are found.

According to one or more embodiments of the present disclosure, the dynamic obstacle tracking method further includes causing the unmanned vehicle to perform an avoidance maneuver based on at least one of the dynamic obstacles that is found, and based on the movement information.

According to one or more embodiments of the present disclosure, the dynamic obstacle tracking method further includes setting the first threshold value to a value that is greater than a size of a human, a size of an animal, and a size of a vehicle.

According to one or more embodiments of the present disclosure, the dynamic obstacle tracking method further includes displaying the occupancy map, wherein the occupancy map is displayed such that areas within the occupancy map that have a higher occupancy rate than occupancy rates of other areas of the occupancy map are displayed darker than the other areas of the occupancy map.

According to one or more embodiments of the present disclosure, the environment recognition sensor includes at least one from among a light detection and ranging (lidar) sensor, a visible light camera, a thermal imaging camera, and a laser sensor.

According to one or more embodiments of the present disclosure, the performing the object segmentation process includes performing a semantic segmentation process on the occupancy map and recognizing types of the objects obtained by the semantic segmentation process.

According to one or more embodiments of the present disclosure, the dynamic obstacle tracking method further includes: classifying the objects as the dynamic obstacles and static obstacles based on the types of the objects that are recognized; and additionally filtering out areas from the occupancy map that are occupied by objects that are classified as the static obstacles, wherein the searching for the dynamic obstacles includes searching for the dynamic obstacles in the entirety of the occupancy map except for the areas that are filtered out based on the first threshold value and the areas that are filtered out based on being occupied by the objects that are classified as the static obstacles.

According to embodiments of the present disclosure, a dynamic obstacle tracking method is provided. The dynamic obstacle tracking method includes: acquiring, from an environment recognition sensor, environmental data regarding surroundings of an unmanned vehicle; generating an occupancy map, that is grid-based, by processing the environmental data; recognizing types of objects by performing a semantic segmentation process on areas of the occupancy map; classifying the objects as dynamic obstacles and static obstacles; filtering out areas from the occupancy map that are occupied by objects that are classified as the static obstacles; and finding the dynamic obstacles by searching for the dynamic obstacles in an entirety of the occupancy map except for the areas that are filtered out.

According to one or more embodiments of the present disclosure, the finding the dynamic obstacles includes repeatedly performing particle generation, prediction, and update processes on the entirety of the occupancy map except for the areas that are filtered out.

According to one or more embodiments of the present disclosure, the dynamic obstacle tracking method further includes displaying marks that indicate the dynamic obstacles that are found on the occupancy map.

According to one or more embodiments of the present disclosure, the dynamic obstacle tracking method further includes displaying movement information corresponding to the marks, the movement information including at least one from among a position, a moving in direction, and a moving speed of each of the dynamic obstacles that are found.

According to one or more embodiments of the present disclosure, the dynamic obstacle tracking method further includes causing the unmanned vehicle to perform an avoidance maneuver based on at least one of the dynamic obstacles that is found, and based on the movement information.

According to one or more embodiments of the present disclosure, the environment recognition sensor includes at least one from among a light detection and ranging (lidar) sensor, a visible light camera, a thermal imaging camera, and a laser sensor.

According to embodiments of the present disclosure, a system is provided. The system includes: at least one processor; and memory storing computer instructions, wherein the computer instructions, when executed by the at least one processor, are configured to cause the at least one processor to: acquire, from an environment recognition sensor, environmental data regarding surroundings of an unmanned vehicle; generate an occupancy map, that is grid-based, by processing the environmental data; obtain objects by performing an object segmentation process on the occupancy map; filter out areas from the occupancy map that are occupied by objects that have a size greater than a first threshold value, among all of the objects obtained based on the object segmentation process; and find dynamic obstacles by searching for the dynamic obstacles in an entirety of the occupancy map except for the areas that are filtered out.

According to one or more embodiments of the present disclosure, the computer instructions, when executed by the at least one processor, are configured to cause the at least one processor to perform the object segmentation process only on areas of the occupancy map that have an occupancy rate greater than a second threshold value.

According to one or more embodiments of the present disclosure, the computer instructions, when executed by the at least one processor, are configured to cause the at least one processor to perform the searching by repeatedly performing particle generation, prediction, and update processes on the entirety of the occupancy map except for the areas that are filtered out.

According to the aforementioned and other embodiments of the present disclosure, movement information of all dynamic obstacles, such as position, moving direction, and moving speed direction can be easily generated regardless of the types of the dynamic obstacles.

Also, false positives such as misidentified dynamic obstacles that actually are static obstacles can be effectively reduced, and as a result, the performance of autonomous driving can be improved.

Also, dynamic obstacles can be searched for and found in real time with a relatively small amount of hardware resources, as compared to an artificial intelligence (AI) learning-based dynamic obstacle tracking technique that requires a relatively large amount of hardware resources.

However, aspects and effects of embodiments of the present disclosure are not restricted to those described herein. The above and other aspects and effects of embodiments of the present disclosure will become more apparent to one of ordinary skill in the art to which the present disclosure pertains by referencing the detailed description of the present disclosure given below.

BRIEF DESCRIPTION OF DRAWINGS

The above and other aspects and features of embodiments of the present disclosure will become more apparent by describing in detail non-limiting example embodiments thereof with reference to the attached drawings, in which.

DETAILED DESCRIPTION

Figure 1:
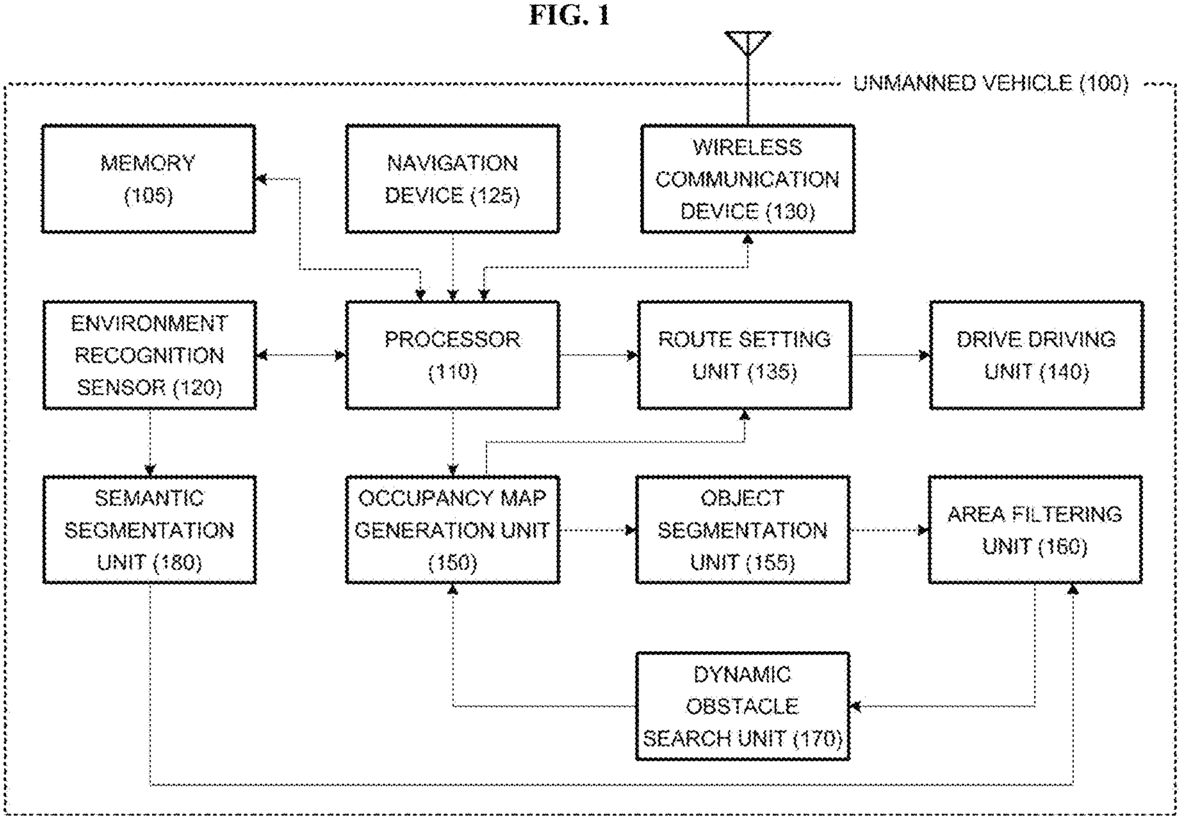
FIG. 1 is a block diagram of an unmanned vehicle according to an embodiment of the present disclosure.

Advantages and features of embodiments of the present disclosure will become apparent from the descriptions of non-limiting example embodiments below with reference to the accompanying drawings. However, embodiments of the present disclosure are not limited to example embodiments described herein and may be implemented in various ways. The example embodiments are provided for making the present disclosure thorough and for fully conveying the scope of the present disclosure to those skilled in the art. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for describing example embodiments rather than limiting the present disclosure. As used herein, the singular forms are intended to include plural forms as well, unless the context clearly indicates otherwise. Throughout this specification, the word “comprise” (and “includes”) and variations such as “comprises” and “comprising” (and “includes” and “including”) will be understood to imply the inclusion of stated elements but not the exclusion of any other elements.

It will be understood that when an element is referred to as being “on,” “connected to,” or “coupled to” another element, it can be directly on, connected to, or coupled to the other element or intervening elements may be present. In contrast, when an element is referred to as being “directly on,” “directly connected to,” or “directly coupled to” another element, there are no intervening elements present.

Hereinafter, non-limiting example embodiments of the present disclosure will be described in detail with reference to the accompanying drawings.

FIG. 1 is a block diagram of an unmanned vehicle according to an embodiment of the present disclosure.

Referring to FIG. 1, an unmanned vehicle 100 may include, for example, a processor 110, a memory 105, an environment recognition sensor 120, a navigation device 125, a wireless communication device 130, a route setting unit 135, a drive driving unit 140, an occupancy map generation unit 150, an object segmentation unit 155, an area filtering unit 160, a dynamic obstacle search unit 170.

The processor 110 may function as a controller for controlling the operations of the other elements of the unmanned vehicle 100 and may be implemented as a central processing unit (CPU) or a microprocessor. The memory 105, which is a storage medium for storing result data from the processor 110 or data for operating the processor 110, may be implemented as a volatile memory or a nonvolatile memory. The memory 105 stores instructions that can be executed by the processor 110 and provides the instructions upon request from the processor 110 such that, for example, the processor 110 performs its functions.

Figure 2A:
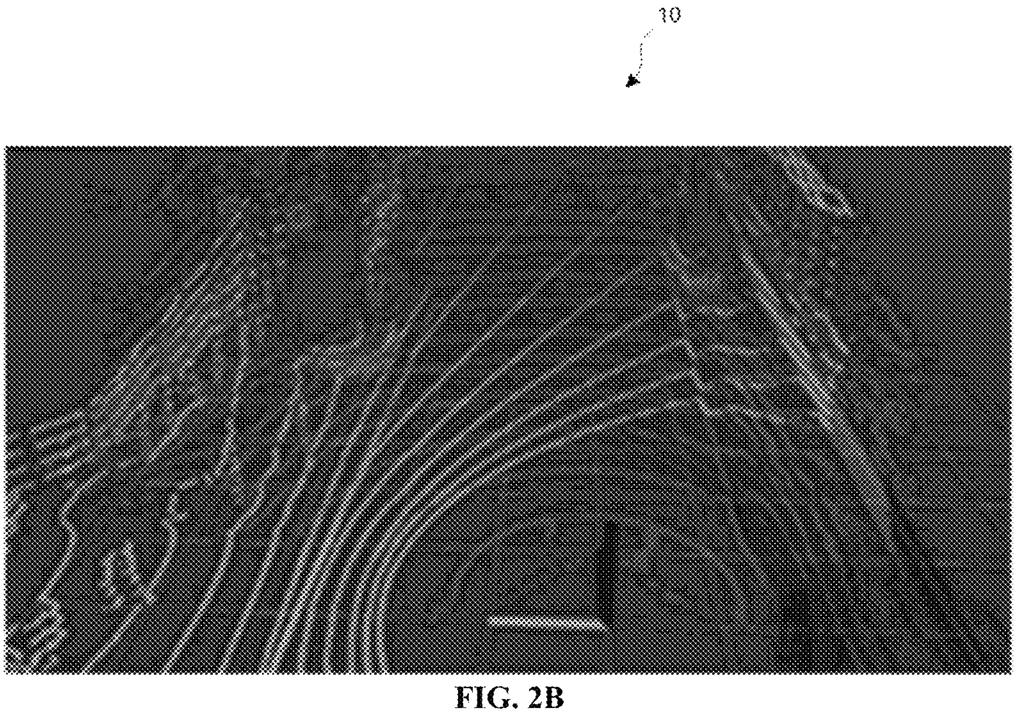
FIG. 2A is a lidar scan image obtained from a lidar sensor.
Figure 2B:
FIG. 2B is a lidar scan image obtained from a visible light image captured by a camera.

The environment recognition sensor 120 is a means for acquiring environmental data regarding the surroundings of the unmanned vehicle 100 by receiving reflected waves of electromagnetic waves irradiated around the unmanned vehicle 100. For example, the environment recognition sensor 120 may include lidar sensors, a camera sensor (e.g., a visible light camera or a thermal imaging camera), and a laser sensor, which are installed at various locations in the unmanned vehicle 100, to recognize terrain and obstacles at the front and the rear of the unmanned vehicle for autonomous driving. For example, a lidar scan image 10 obtained from a lidar sensor 121 (refer to FIG. 3) is as shown in FIG. 2A, and a visible light image 15 captured by a camera 123 (refer to FIG. 3) is as shown in FIG. 2B.

The lidar sensor 121 may accurately identify its surroundings by emitting laser light, receiving reflected light from surrounding objects, and measuring the distances to the surrounding objects based on the received reflected light. Referring to FIG. 2A, one or more point clouds obtained from reflect laser light from objects (e.g., a mountain, a tree, a road, etc.) around the unmanned vehicle 100 are displayed in various colors.

The navigation device 125, which is a device for identifying the current position and the posture of the unmanned vehicle 100, may include a global navigation satellite system (GNSS) and an inertial measurement device (IMU). The navigation device 125 enables not only the position (or coordinates including latitude and longitude) of the unmanned vehicle 100, but also the direction faced by the unmanned vehicle 100 (or the posture of the unmanned vehicle 100) to be identified in real time. The position of the unmanned vehicle 100 may be obtained from a global positioning system (GPS) or a beacon device (e.g., a cell base station, etc.) of the navigation device 125, and the direction/posture of the unmanned vehicle 100 may be obtained from the pitch, roll, and yaw values of an inertial sensor of the navigation device 125.

Figure 3:
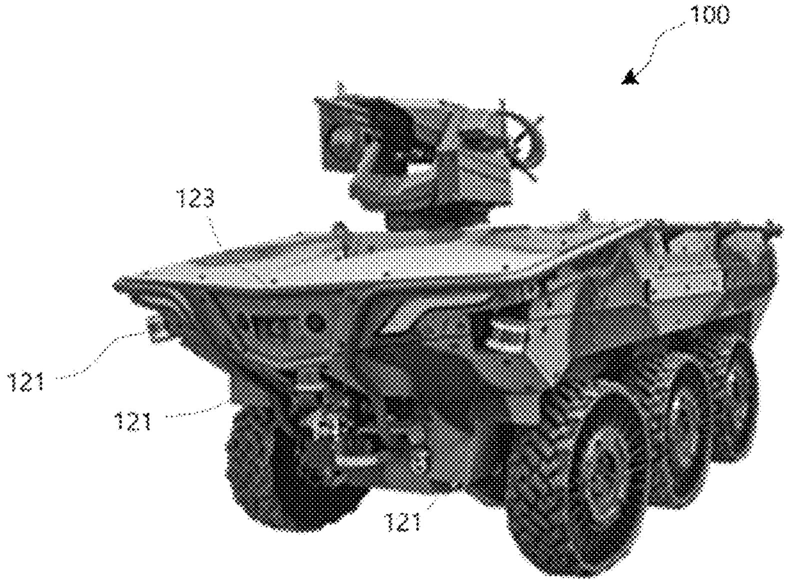
FIG. 3 is a perspective view of an unmanned vehicle with lidar sensors and a camera installed at various locations.

FIG. 3 is a perspective view of the unmanned vehicle 100 with lidar sensors 121 and a camera 123 installed at various locations. Referring to FIG. 3, three lidar sensors 121 are installed at three locations at the front of the unmanned vehicle 100, and the camera sensor 123 may be installed at one location at the center of the front of the unmanned vehicle 100. Thus, most of surroundings information of the unmanned vehicle 100 may be obtained by the lidar sensors 121, but the type and the attributes of each object may be identified using the camera sensor 123 and an algorithm (e.g., You Only Look Once (“YOLO”)) capable of recognizing each object in an image from the camera sensor 123. Although not specifically shown in FIG. 3, the navigation device 125 may be installed near the center of gravity of the unmanned vehicle 100.

The wireless communication device 130 performs data communication between the unmanned vehicle 100 and a control center or another unmanned vehicle. The wireless communication device 130 may transmit not only an occupancy map generated by the occupancy map generation unit 150, but also information such as the type and attributes of each object.

The route setting unit 135 may create global and local routes using the occupancy map generated by the occupancy map generation unit 150 and may calculate a steering angle and driving speed for following the global and local routes. Then, the drive driving unit 140 may perform driving control such as the steering, braking, and acceleration of the wheels of the unmanned vehicle 100 to satisfy the calculated steering angle and driving speed.

Figure 4:
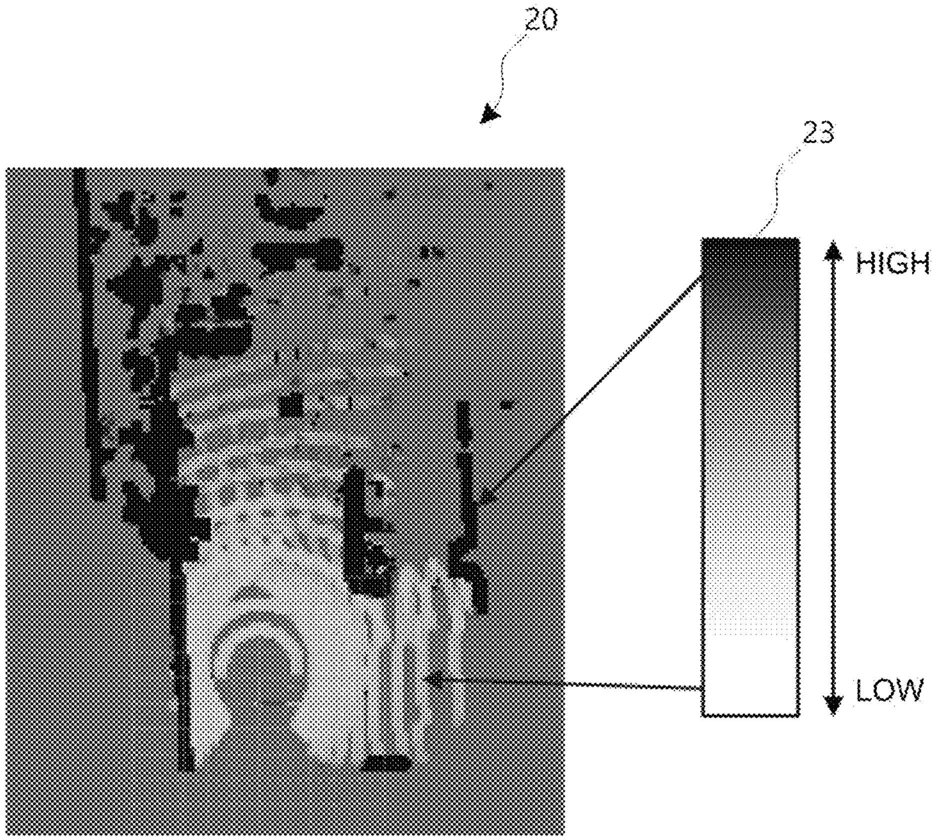
FIG. 4 shows an example of a grid-based occupancy map obtained from the lidar sensors of FIG. 3.

The occupancy map generation unit 150 generates a grid-based occupancy map by processing the environmental data from the environment recognition sensor 120. The grid-based occupancy map displays various obstacles and a drivable area where the unmanned vehicle 100 can drive, on a two-dimensional (2D) plane. FIG. 4 shows an example of an occupancy map 20 that is grid-based.

Referring to FIG. 4, the occupancy map 20 displays obstacles in contrast in accordance with an occupancy rate (or probability) 23 of the obstacles without classifying the type and the attributes of the obstacles. The occupancy rate 23 may be expressed as a value between 0 and 1. The higher the occupancy rate 23 of an area, the darker the area is displayed on the occupancy map 20, and the lower the occupancy rate 23 of the area, the brighter the area is displayed on the occupancy map 20. Accordingly, an area with a low occupancy rate, i.e., a bright area, may be determined as a drivable area such as the surface of a road.

Figure 5:
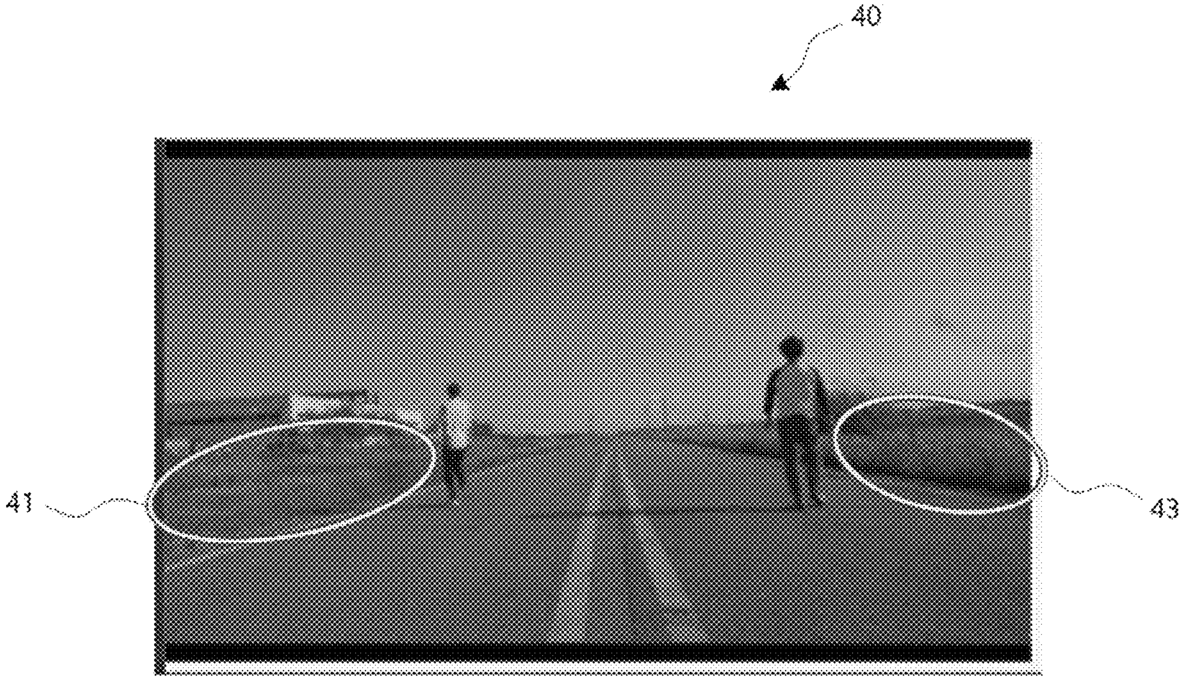
FIG. 5 shows an image captured by the camera of FIG. 3, corresponding to the occupancy map of FIG. 4.

FIG. 5 shows an image 40 captured by the camera 123, corresponding to the occupancy map 20. Referring to FIG. 5, there are dynamic obstacles such as humans existing on a road in the middle of the image 40, and there are static obstacles 41 and 43, such as bushes or buildings, around the road. Referring to FIGS. 4 and 5, the surface of the road is displayed bright in the middle of the occupancy map 20, and various obstacles on both sides of the road are displayed dark on the occupancy map 20.

Figure 6:
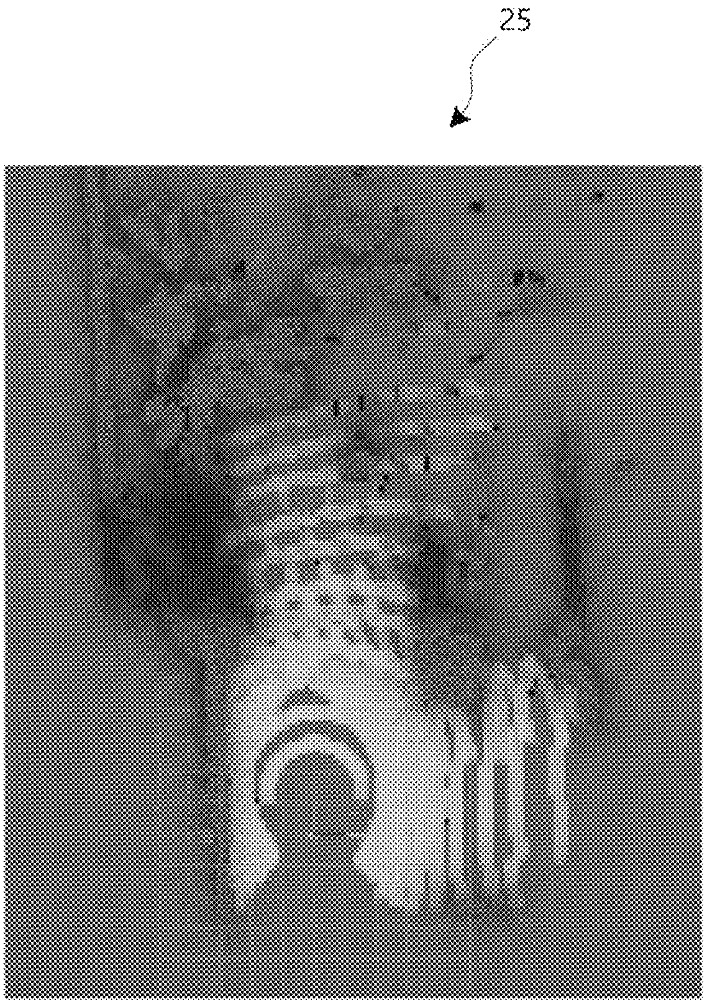
FIG. 6 shows particle-based tracking information.

Dynamic obstacles may be detected by applying a particle tracking algorithm to the occupancy map 20. In this manner, particle-based tracking information of FIG. 6 may be obtained.

However, if the particle tracking algorithm is applied to the occupancy map 20, false positives such as misidentified dynamic obstacles may occur for various reasons and are apparent, particularly, near guardrails around roads in urban environments or in thick forests around driving paths in wild environments. For example, false positives may occur when the unmanned vehicle 100 mistakenly recognizes different objects as appearing repeatedly along the road 42 and thus misidentifies the objects as being the same object moving along the road 42 due to the similarity in shape therebetween, during a particle recognition process. The problem associated with false positives degrades the performance of autonomous driving and is currently addressed by ignoring false positives that occur in particular situations based on the experiences and judgments of the operators of unmanned vehicles.

Embodiments of the present disclosure provide a method of suppressing false positives by filtering out areas that meet a particular condition from the occupancy map 20, which is generated using the lidar sensors 121. Specifically, the object segmentation unit 155 performs object segmentation on the occupancy map 20. Object segmentation divides an image based on the same or similar objects (or obstacles) on the occupancy map 20. Object segmentation may be performed based on the occupancy rate 23 of the occupancy map 20 or using the result of the analysis of the image obtained from the camera sensor 123.

Object segmentation may be performed only on areas of the occupancy map 20 that have an occupancy rate (or probability) 23 exceeding a second threshold value. Specifically, objects with too low of an occupancy rate 23 to even be static obstacles are unlikely to be dynamic obstacles. Thus, by filtering out or removing such objects in advance, the computation speed when applying the particle tracking algorithm can be enhanced, and the probability of false positives can be further lowered.

The area filtering unit 160 considers obstacles with a larger object size (or area) than a first threshold value as static obstacles, and filters out such obstacles. Specifically, the area filtering unit 160 filters out areas occupied by objects whose size is greater than the first threshold value, among all the areas obtained by object segmentation. Here, the first threshold value may be set to a value greater than the sizes of a human, an animal, and a vehicle. That is, areas including obstacles that are larger in size than objects that can be dynamic obstacles such as humans, animals, or vehicles are excluded to prevent false positives in such areas.

Figure 7:
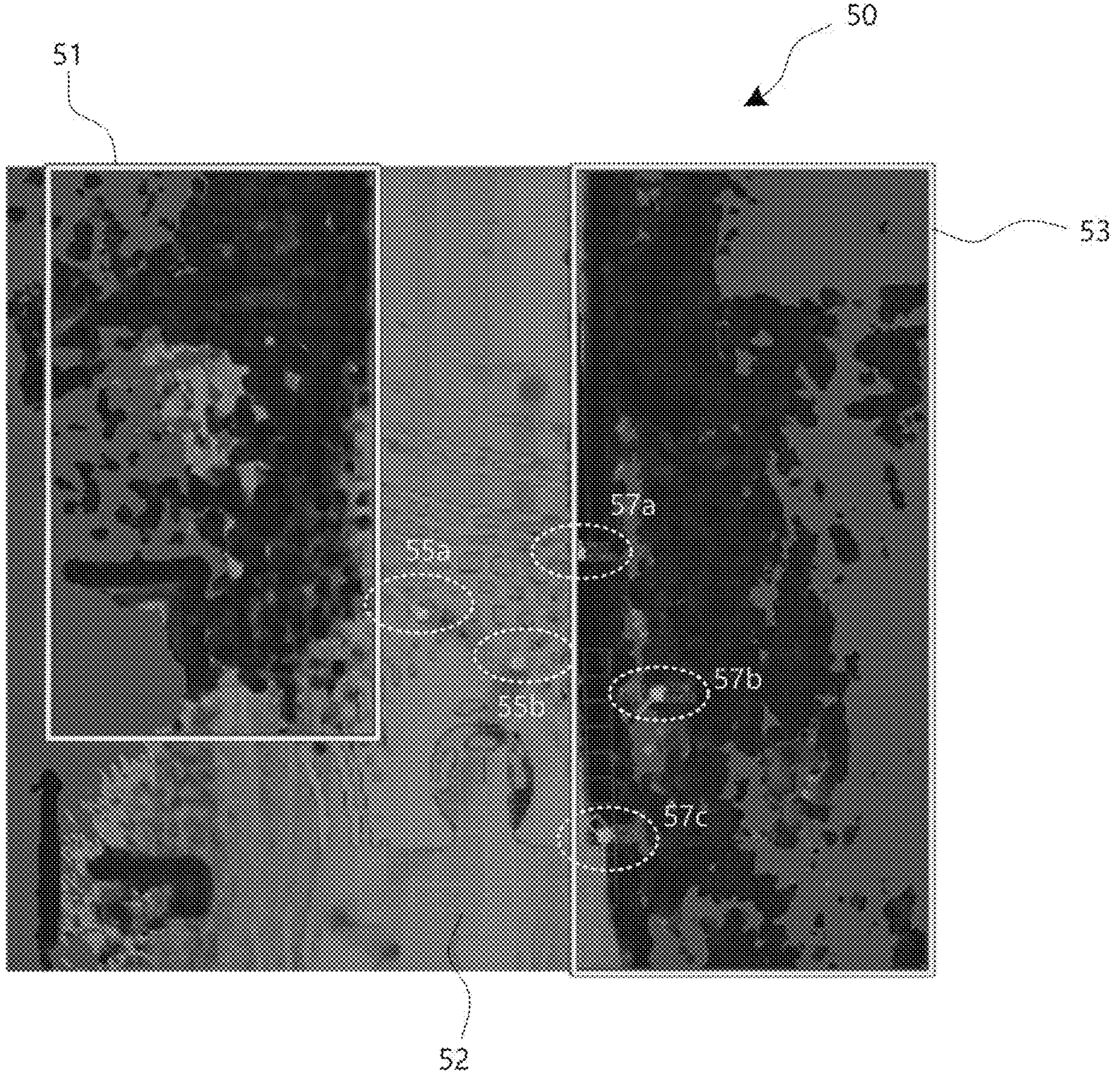
FIG. 7 shows a grid-based occupancy map with dynamic obstacles displayed thereon.

FIG. 7 shows an occupancy map 50, that is grid-based, and dynamic obstacles discovered from the occupancy map 50. Referring to FIG. 7, a road 52 is displayed in the middle of the occupancy map 50, and areas 51 and 53 are displayed on both sides of the road 52. A plurality of potential dynamic obstacles 55*a*, 55*b*, 57*a*, 57*b*, and 57*c* that are found by a particle-based search are displayed on the occupancy map 50. The potential dynamic obstacles 55*a* and 55*b* in the middle may be true dynamic obstacles that are actually moving, but the potential dynamic obstacles 57*a*, 57*b*, and 57*c* on the right side may be false dynamic obstacles or false positives.

To address this problem, the area filtering unit 160 filters out areas occupied by objects whose size is greater than the first threshold value from the occupancy map 50. Referring to FIG. 7, as the areas 51 and 53 include objects that are large in size and are thus unlikely to be dynamic obstacles, the areas 51 and 53 may be filtered out in advance by the area filtering unit 160 before a particle-based search for dynamic obstacles, and the result of the filtering is provided by the area filtering unit 160 to the dynamic obstacle search unit 170.

The dynamic obstacle search unit 170 searches for dynamic obstacles from the entire occupancy map 50 excluding the filtered-out areas (e.g., area 51 and 53). For example, a particle-based tracking algorithm may be used by the dynamic obstacle search unit 170 in a dynamic obstacle search. The particle-based tracking algorithm searches for dynamic obstacles while searching for any temporal changes in all particles on the occupancy map 50. Specifically, the particle-based tracking algorithm shows whether the same object consisting of a plurality of particles appears, where the object is, and in which direction the object is moving (i.e., movement information of the object) through repeated creation, prediction, and update processes.

Figure 8:
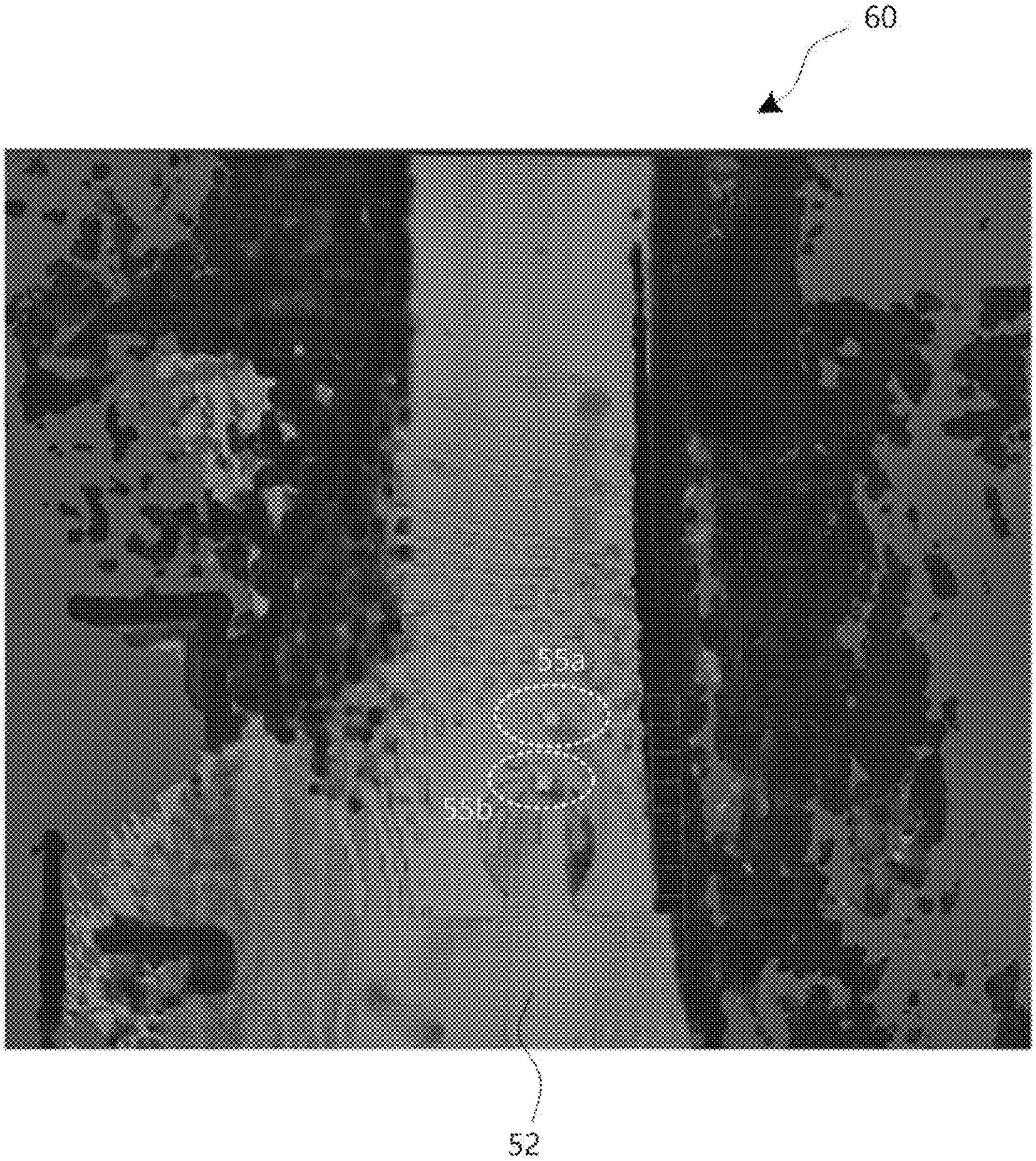
FIG. 8 shows the result of searching for and finding of dynamic obstacles from the entire occupancy map of FIG. 7 except for filtered-out areas.

FIG. 8 shows a result image 60 obtained by performing, by the dynamic obstacle search unit 170, a dynamic obstacle search on the entire occupancy map (e.g., the occupancy map 50) excluding the filtered-out areas (e.g., areas 51 and 53). Referring to FIG. 8, there are only two potential dynamic obstacles 55*a* and 55*b* on the road 52 in the middle, which are true dynamic obstacles, and the potential dynamic obstacles 57*a*, 57*b*, and 57*c*, which are false dynamic obstacles, of FIG. 7 have all been removed.

Figure 9:
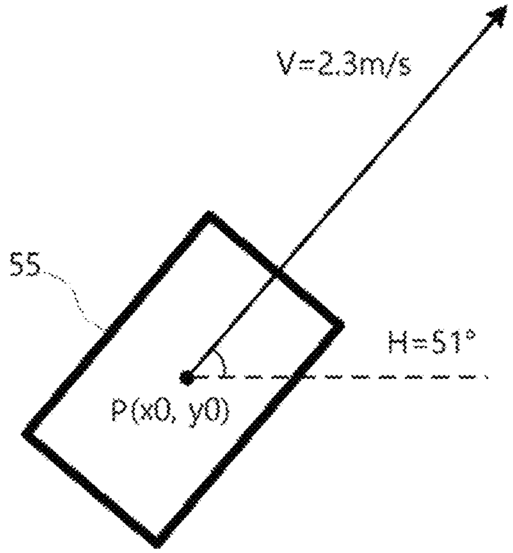
FIG. 9 illustrates how a mark for a dynamic obstacle and movement information of the dynamic obstacle may be displayed.

The occupancy map generation unit 150 displays (e.g., on a display which may be separate from the unmanned vehicle 100) marks 55 (refer to FIG. 9) for the dynamic obstacles 55*a* and 55*b* on the occupancy map 50. Movement information including the positions, moving directions, and/or moving speeds of the dynamic obstacles 55*a* and 55*b* may be displayed near the marks 55. FIG. 9 illustrates an example of a mark 55 for a dynamic obstacle and movement information of the dynamic obstacle may be displayed by the occupancy map generation unit 150. The mark 55 may be displayed in various shapes depending on the type of the dynamic obstacle (e.g., whether the dynamic obstacle is a human, an animal, or a vehicle). Referring to FIG. 9, for a particular dynamic obstacle, a mark 55 (e.g., a rectangular mark) and the position, moving direction, and moving speed of the particular dynamic obstacle are displayed together. A position P, a moving direction H, and a moving speed V of the particular dynamic obstacle are (x0, y0), 51°, and 2.3 m/s, respectively. Accordingly, the operator of the unmanned vehicle 100 can identify the type, position, moving direction, and moving speed of each dynamic obstacle and can perform an avoidance maneuver of the unmanned vehicle 100 for each dynamic obstacle during autonomous driving, semi-autonomous driving, or manual driving.

As a result, the route setting unit 135 can set a driving path for the unmanned vehicle 100 based on the occupancy map generated by the occupancy map generation unit 150 and movement information of each dynamic obstacle, and the drive driving unit 140 can perform an avoidance maneuver for each dynamic obstacle by driving along the driving path set by the route setting unit 135.

In some embodiments, the unmanned vehicle 100 may further include a semantic segmentation unit 180. The semantic segmentation unit 180 may classify objects as static obstacles and dynamic obstacles by performing semantic segmentation using the environment recognition sensor 120, which includes the lidar sensors 121 and the camera 123. Then, the dynamic obstacle search unit 170 can prevent false positives by performing a dynamic obstacle search only on objects that are classified as dynamic obstacles.

Semantic segmentation, which semantically classifies one or more objects included in an object, may be performed via video analytics or machine learning using an artificial neural network such as a convolutional neural network (CNN). According to embodiments, the semantic segmentation includes finding at least one object having a meaning from an input image and segmenting the found object, and classifying the segmented objects into at least one object group having a similar meaning.

In this case, the area filtering unit 160 filters out areas occupied by static obstacles so as to avoid objects classified as the static obstacles from being misidentified as dynamic obstacles, and this type of filtering process may be referred to as a secondary filtering process. The secondary filtering process may be performed in addition to, or independently from, a primary filtering process, which is a filtering process performed based on the size of segmented objects from the occupancy map 50.

Figure 10:
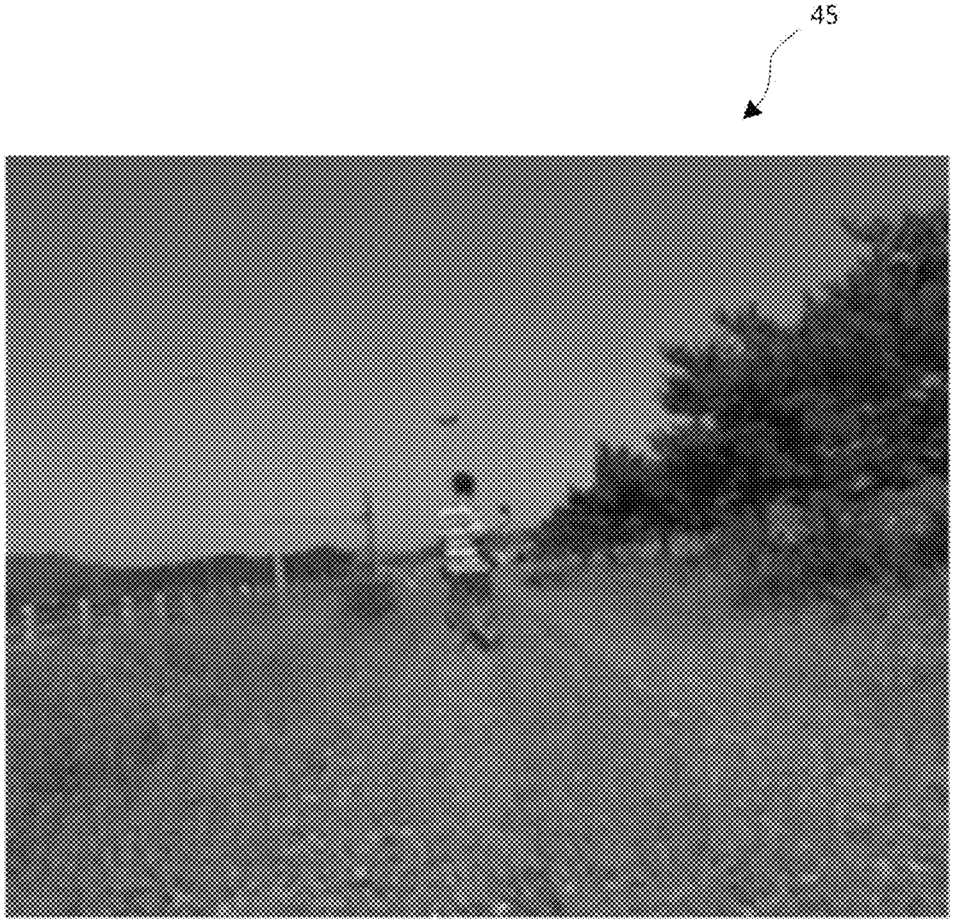
FIG. 10 shows an image captured by a camera.
Figure 11:
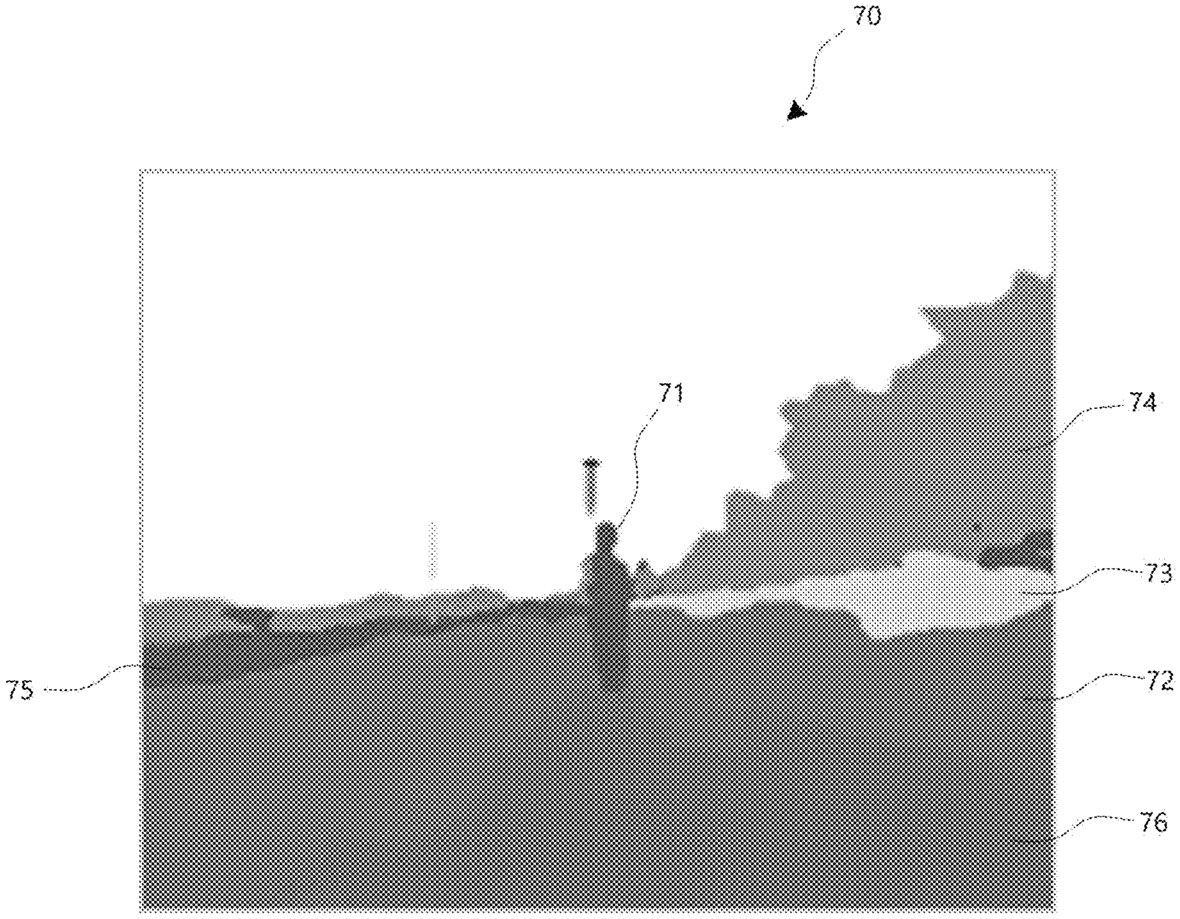
FIG. 11 shows a conversion image obtained by applying semantic segmentation to the image of FIG. 10.

FIG. 10 shows an image 45 captured by the camera 123, and FIG. 11 shows a conversion image 70 obtained by applying semantic segmentation to the image 45 by, for example, the object segmentation unit 155. Referring to FIG. 10, the image 45, which includes various objects, may be segmented into areas depending on the types of obstacles, and the areas may be displayed in the conversion image 70 of FIG. 11.

Referring to FIG. 11, the conversion image 70 includes a human 71, a road 76, grass 72, bushes 73, trees 74, and other obstacles 75. Only the human 71 on the road 76 is a dynamic obstacle, and the other objects of the conversion image 70, which is generated by the semantic segmentation unit 180, are all static obstacles. Thus, an area of the conversion image 70, including the human 71 and the road 76, may be transmitted to the area filtering unit 160.

The area filtering unit 160 filters out (or excludes) all areas except for the dynamic obstacle area including the human 71 and the road 76 from the occupancy map 50 and provides the result of the filtering to the dynamic obstacle search unit 170. For a margin of error, the dynamic obstacle area including the human 71 and the road 76 may preferably be set to be larger than it actually is. In this manner, the dynamic obstacle search unit 170 can reduce false positives by applying the particle-based tracking algorithm based on grid occupancy information of each dynamic obstacle.

As already mentioned above, only a size-based filtering process (or the primary filtering process) may be performed, or the size-based filtering process and a semantic segmentation-based filtering process (or the secondary filtering process) may both be performed. Alternatively, only the semantic segmentation-based filtering process (or the secondary filtering process) may be performed, and this will hereinafter be described.

Figure 12:
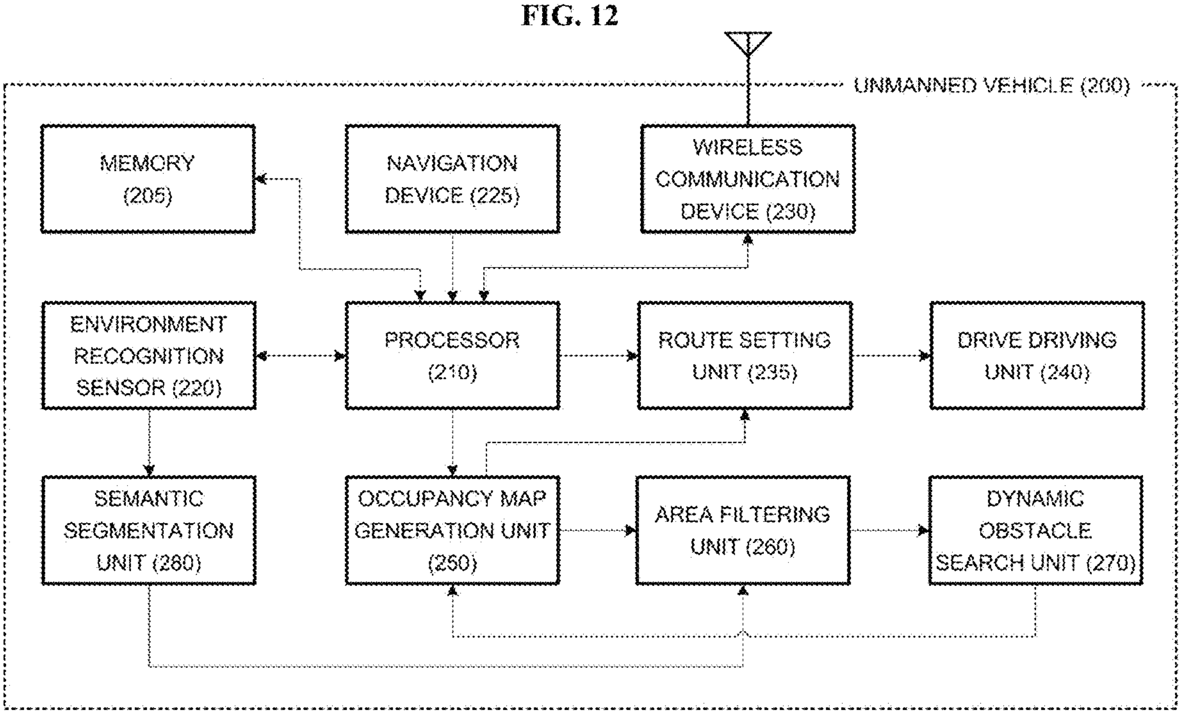
FIG. 12 is a block diagram of an unmanned vehicle according to another embodiment of the present disclosure.

FIG. 12 is a block diagram of an unmanned vehicle according to another embodiment of the present disclosure. The embodiment of FIG. 12 will hereinafter be described, focusing on the differences with the embodiment of FIG. 1. Repeated descriptions may be omitted for clarity.

Referring to FIG. 12, an unmanned vehicle 200 may include, for example, a processor 210, a memory 205, an environment recognition sensor 220, a navigation device 225, a wireless communication device 230, a route setting unit 235, a drive driving unit 240, an occupancy map generation unit 250, an area filtering unit 260, a dynamic obstacle search unit 270, and a semantic segmentation unit 280. According to embodiments, the above-described components may be the same or similar to the corresponding components described above with respect to FIG. 1.

The environment recognition sensor 220 acquires environmental data regarding the surroundings of the unmanned vehicle 200. The environment recognition sensor 220 may include a plurality of sensors including lidar sensors and a camera sensor (e.g., a visible light camera or a thermal imaging camera).

The occupancy map generation unit 250 generates a grid-based occupancy map by processing the environmental data. The semantic segmentation unit 280 performs a semantic segmentation process on areas of the occupancy map and may thus recognize the types of objects obtained by the semantic segmentation process. Also, the semantic segmentation unit 280 classifies the objects into dynamic obstacles and static obstacles based on the result of the recognition.

Areas of the occupancy map that are classified as dynamic obstacles are provided to the area filtering unit 260. The area filtering unit 260 selects only the areas that are classified as dynamic obstacles from the occupancy map and transmits the selected areas to the dynamic obstacle search unit 270. The dynamic obstacle search unit 270 searches for and finds dynamic obstacles from the entire occupancy map except for filtered-out areas. Here, the process of searching for and finding dynamic obstacles includes repeatedly performing particle generation, prediction, and update processes on the entire occupancy map except for the filtered-out areas.

The dynamic obstacle search unit 270 displays (e.g., on a display separate from the unmanned vehicle 200) marks for the found dynamic obstacles on the occupancy map and also displays movement information, including at least one from among the position, the moving direction, and the moving speed of each of the found dynamic obstacles, near the marks.

Accordingly, the drive driving unit 240 can perform an avoidance maneuver of the unmanned vehicle 200 for each dynamic obstacle based on the occupancy map and the movement information of each dynamic obstacle.

Figure 13:
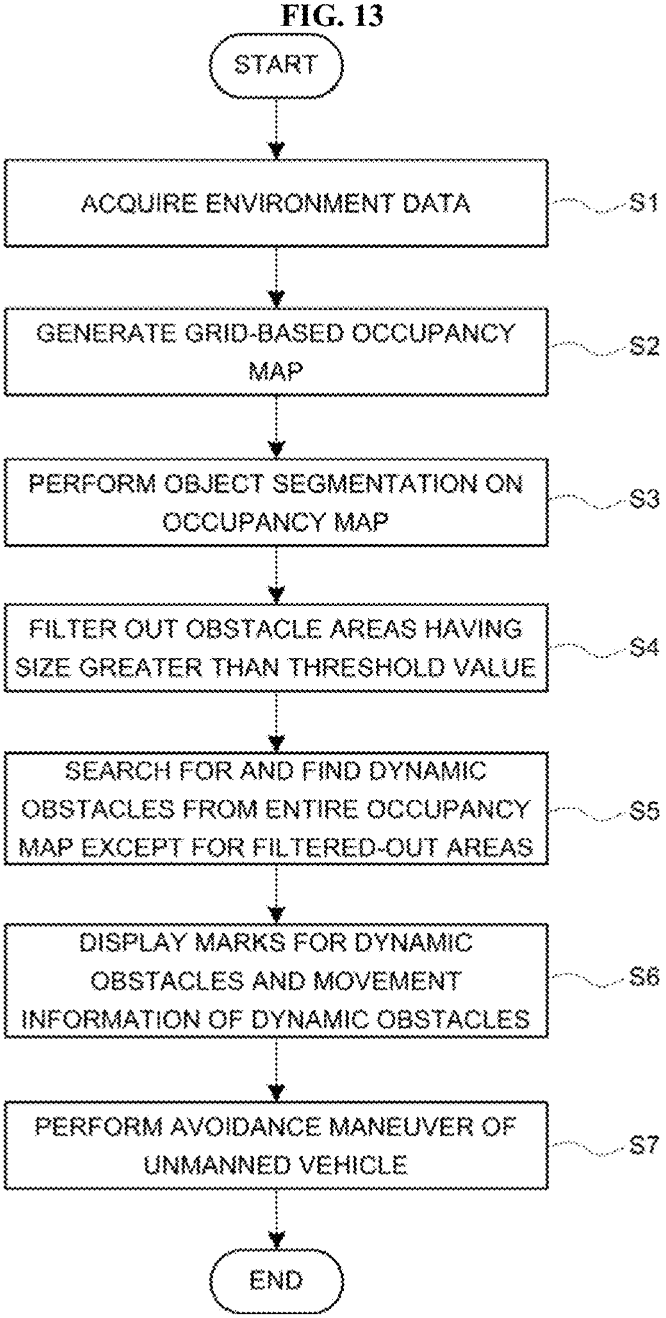
FIG. 13 is a flowchart illustrating a dynamic obstacle tracking method performed by the unmanned vehicle of FIG. 1.

FIG. 13 is a flowchart illustrating a dynamic obstacle tracking method performed by the unmanned vehicle 100, according to an embodiment of the present disclosure.

Referring to FIG. 13, environmental data regarding the surroundings of the unmanned vehicle 100 is acquired using the environment recognition sensor 120 (step S1), and the occupancy map generation unit 150 generates a grid-based occupancy map (step S2) by processing the environmental data.

Thereafter, the object segmentation unit 155 performs an object segmentation process on areas of the occupancy map (step S3). The object segmentation process may be performed only on areas of the occupancy map that have an occupancy rate exceeding a second threshold value.

Thereafter, the area filtering unit 160 filters out areas occupied by objects whose size is greater than a first threshold value, among all objects obtained by the object segmentation process, from the occupancy map (step S4).

Thereafter, the dynamic obstacle search unit 170 searches for and finds dynamic obstacles from the entire occupancy map except for the filtered-out areas (step S5). Thereafter, the dynamic obstacle search unit 170 displays marks for the found dynamic obstacles on the occupancy map and also displays movement information of each of the found dynamic obstacles, together with the marks (step S6). The movement information includes at least one from among the position, the moving direction, and the moving speed of each of the found dynamic obstacles.

Thereafter, the drive driving unit 140 performs an avoidance maneuver of the unmanned vehicle 100 for each of the found dynamic obstacles based on the occupancy map and the movement information (step S7).

In some embodiments, a semantic segmentation-based filtering process (or a secondary filtering process) may be performed additionally or alone, and this will hereinafter be described with reference to FIG. 14.

Figure 14:
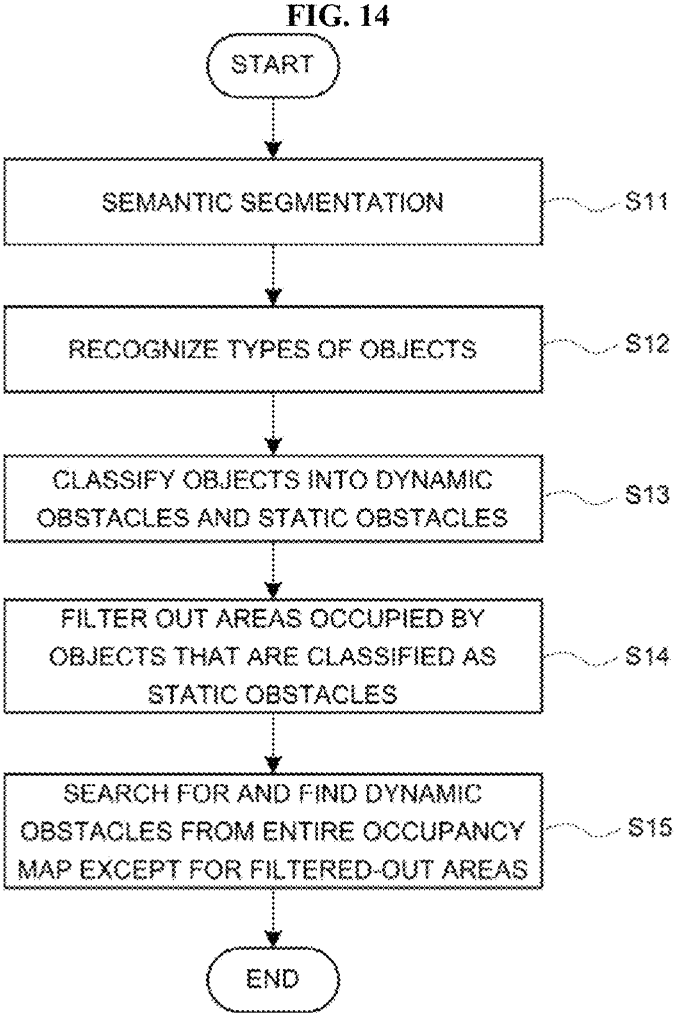
FIG. 14 is a flowchart illustrating a dynamic obstacle tracking method performed by the unmanned vehicle of FIG. 12.

FIG. 14 is a flowchart illustrating a dynamic obstacle tracking method performed by the unmanned vehicle 200, according to an embodiment of the present disclosure.

Referring to FIG. 14, the semantic segmentation unit 280 performs a semantic segmentation process on an occupancy map obtained by the lidar sensors 121 (step S11) and recognizes the types of objects obtained by the semantic segmentation process (step S12). The semantic segmentation process may be performed on an image captured by the camera 123, via video analytics or neural network-based learning.

Thereafter, the semantic segmentation unit 280 classifies the objects into dynamic obstacles and static obstacles based on the recognized types of the objects (step S13).

The dynamic obstacle search unit 270 filters out (or removes) areas occupied by objects that are classified as the static obstacles, from the occupancy map (step S14) so as to avoid the objects that are classified as the static obstacles from being misidentified as the dynamic obstacles. In other words, only areas occupied by obstacles that are classified as the dynamic obstacles are included in the occupancy map.

In this manner, the dynamic obstacle search unit 270 searches for and finds dynamic obstacles by applying the particle-based tracking algorithm only to the areas occupied by the obstacles that are classified as the dynamic obstacles.

Each component described above with reference to FIGS. 1 and 12 may be implemented as a software component, such as a task performed in a predetermined region of a memory, a class, a subroutine, a process, an object, an execution thread or a program, or a hardware component, such as a Field Programmable Gate Array (FPGA) or Application Specific Integrated Circuit (ASIC). In addition, the components may be composed of a combination of the software and hardware components. The components may reside on a computer readable storage medium or may be distributed over a plurality of computers.

Each block may represent a module, segment, or portion of code, which comprises one or more executable instructions for implementing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

According to embodiments of the present disclosure, one or more (e.g., some or all) of the components describes with reference to FIGS. 1 and 12 may be external to the unmanned vehicle 100 (or the unmanned vehicle 200).

According to embodiments of the present disclosure, at least one processor and memory storing computer instructions may be provided. The computer instructions, when executed by the at least one processor, may be configured to cause the at least one processor to implement (e.g., perform the functions of) one or more (e.g., some or all) of the route setting unit 135, the drive driving unit 140, the occupancy map generation unit 150, the object segmentation unit 155, the area filtering unit 160, the dynamic obstacle search unit 170, the semantic segmentation unit 180, the route setting unit 235, the drive driving unit 240, the occupancy map generation unit 250, the area filtering unit 260, the dynamic obstacle search unit 270, and the semantic segmentation unit 280. The at least one processor and the memory may be provided in the unmanned vehicle 100, or separate from the unmanned vehicle 100 (or the unmanned vehicle 200) and connected to the unmanned vehicle 100 (or the unmanned vehicle 200) by a wired or wireless connection.

Many modifications and other embodiments of the present disclosure will come to the mind of one skilled in the art having the benefit of the teachings presented in the foregoing descriptions and the associated drawings. Therefore, it is understood that embodiments of the present disclosure are not to be limited to the specific example embodiments described herein.

What is claimed is:

1. A dynamic obstacle tracking method performed by at least one processor, the dynamic obstacle tracking method comprising:

- acquiring, from an environment recognition sensor, environmental data regarding surroundings of an unmanned vehicle;
- generating an occupancy map, that is grid-based, by processing the environmental data;
- obtaining a plurality of objects by performing an object segmentation process on the occupancy map;

classifying the plurality of objects based on size information obtained from the object segmentation process;

selectively excluding, from dynamic obstacle detection, portions of the occupancy map corresponding to objects, from among the plurality of objects, having a size greater than a first threshold value; and detecting dynamic obstacles by analyzing motion information in the occupancy map while suppressing an influence of the portions of the occupancy map, which are selectively excluded and correspond to the objects having the size greater than the first threshold value, without removing the portions from the occupancy map.

2. The dynamic obstacle tracking method of claim 1, wherein the performing the object segmentation process comprises performing the object segmentation process only on areas of the occupancy map that have an occupancy rate greater than a second threshold value.

3. The dynamic obstacle tracking method of claim 1, wherein the detecting the dynamic obstacles comprises repeatedly performing particle generation, prediction, and update processes on the entirety of the occupancy map except for the portions of the occupancy map corresponding to the objects having the size greater than the first threshold value.

4. The dynamic obstacle tracking method of claim 3, further comprising:

displaying marks that indicate the dynamic obstacles that are detected.

5. The dynamic obstacle tracking method of claim 4, further comprising:

displaying movement information corresponding to the marks, the movement information including at least one from among a position, a moving direction, and a moving speed of each of the dynamic obstacles that are detected.

6. The dynamic obstacle tracking method of claim 5, further comprising:

causing the unmanned vehicle to perform an avoidance maneuver based on at least one of the dynamic obstacles that is detected, and based on the movement information.

7. The dynamic obstacle tracking method of claim 1, further comprising:

setting the first threshold value to a value that is greater than a size of a human, a size of an animal, and a size of a vehicle.

8. The dynamic obstacle tracking method of claim 1, further comprising:

displaying the occupancy map, wherein the occupancy map is displayed such that areas within the occupancy map that have a higher occupancy rate than occupancy rates of other areas of the occupancy map are displayed darker than the other areas of the occupancy map, wherein the detecting of the dynamic obstacles is performed based on the occupancy map, while the portions of the occupancy map, which are selectively excluded and correspond to the objects having the size greater than the first threshold value, remain in the occupancy map.

9. The dynamic obstacle tracking method of claim 1, wherein the environment recognition sensor includes at least one from among a light detection and ranging (lidar) sensor, a visible light camera, a thermal imaging camera, and a laser sensor.

10. The dynamic obstacle tracking method of claim 1, wherein the performing the object segmentation process comprises performing a semantic segmentation process on the occupancy map and recognizing types of the plurality of objects obtained by the semantic segmentation process, and wherein the portions of the occupancy map, which are selectively excluded, are prevented from affecting the detecting of the dynamic obstacles.

11. The dynamic obstacle tracking method of claim 10, further comprising:

classifying the plurality of objects as the dynamic obstacles and static obstacles based on the types of the plurality of objects that are recognized; and additionally selectively excluding, from the dynamic obstacle detection, portions of the occupancy map corresponding to objects, from among the plurality of objects, that are classified as the static obstacles, wherein the detecting the dynamic obstacles comprises detecting the dynamic obstacles in the entirety of the occupancy map except for the portions of the occupancy map corresponding to the objects having the size greater than the first threshold value and the portions of the occupancy map corresponding to the objects that are classified as the static obstacles, and wherein the occupancy map includes the portions of the occupancy map, which are selectively excluded, during the detecting.

12. A system comprising:

at least one processor; and memory storing computer instructions, wherein the computer instructions, when executed by the at least one processor, are configured to cause the at least one processor to:

acquire, from an environment recognition sensor, environmental data regarding surroundings of an unmanned vehicle;

generate an occupancy map, that is grid-based, by processing the environmental data;

obtain a plurality of objects by performing an object segmentation process on the occupancy map;

classify the plurality of objects based on size information obtained from the object segmentation process;

selectively exclude, from dynamic obstacle detection, portions of the occupancy map corresponding to objects, from among the plurality of objects, having a size greater than a first threshold value; and detect dynamic obstacles by analyzing motion information in the occupancy map while suppressing an influence of the portions of the occupancy map, which are selectively excluded and correspond to the objects having the size greater than the first threshold value, without removing the portions from the occupancy map.

13. The system of claim 12, wherein the computer instructions, when executed by the at least one processor, are configured to cause the at least one processor to perform the object segmentation process only on areas of the occupancy map that have an occupancy rate greater than a second threshold value.

14. The system of claim 12, wherein the computer instructions, when executed by the at least one processor, are configured to cause the at least one processor to perform the detecting by repeatedly performing particle generation, prediction, and update processes on the entirety of the occupancy map except for the portions of the occupancy map corresponding to the objects having the size greater than the first threshold value.

* * * * *